3,092,036
HYDRAULIC PUMPS OR MOTORS
John P. Creighton, Castle Bromwich, England, assignor to Ford Motor Company Limited, London, England
Filed May 18, 1960, Ser. No. 29,948
1 Claim. (Cl. 103—162)

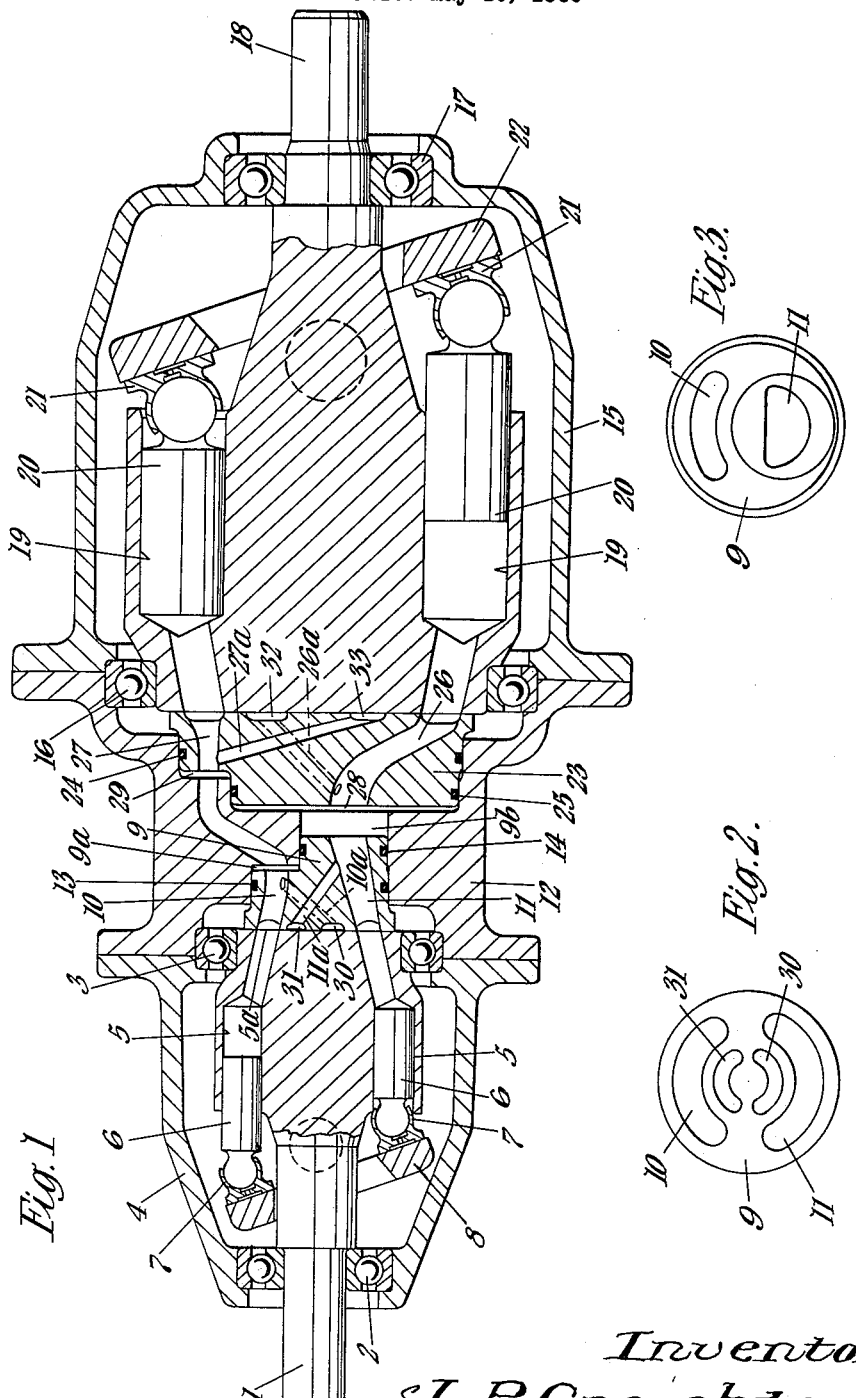

This invention relates to hydraulic pumps or motors more especially but not solely for use in hydrostatic transmissions.

In axial piston pump or motor units it is established practice to use the fluid system pressure to hydraulically load in an axial direction the cylinder barrel against a fixed port plate in a condition of critical balance to obviate or minimise both leakage of pressure fluid and wear of rubbing faces. One or more journal bearings are usually employed to carry the radial loads to which the cylinder barrel is subjected, and it will thus be readily understood by those skilled in the art that this form of construction necessarily imposes the highest degree of accuracy on the alignment of the journal bearings relative to the squareness to the rotational axis of the rubbing faces of the cylinder barrel and the fixed port plate.

This critical construction condition is further aggravated by the fact that the cylinder barrel is subject to fluctuating radial and axial loads, the latter particularly affecting the aforementioned balance condition between the cylinder barrel face and the port plate. The separating force generated by the oil film between these two faces fluctuates in frequency, but not in magnitude, with the axial fluctuation of the cylinder barrel. Axial load fluctuation of the cylinder barrel expressed as a ratio of separating force fluctuation is equal to $D^2/d^2$ where $D$=cylinder bore diameter, and $d$=port diameter. In practice this ratio tends to be of the order of 4:1 to 6:1, which means that some 75% to 83% of the fluctuating axial load must be carried by the port plate, thus imposing arduous bearing conditions on a geometrically critical joint face.

Good quality bearing materials and a high degree of precision in manufacture become obligatory in an axial piston unit of this form of construction, resulting in high cost. Despite this, wear and leakage generally occurs at a rate which necessitates frequent servicing.

An object of this invention is the elmination or alleviation of the aforesaid penalties of precision manufacture, good quality bearing materials, wear, leakage and frequency of service thus resulting in lower initial and running costs.

The present invention consists of an hydraulic pump or motor of the axial piston type in which the cylinder barrel is located and contained by a pair of bearings at least one of which is a combined radial and thrust bearing. Abutting the port face of the cylinder barrel, and replacing the fixed port plate of established practice, is a floating valve distribution member. This component by nature of construction and location has a degree, though limited, of universal articulation, thus enabling it to compensate for malalignment of journal bearings and errors in squareness to the rotational axis of the port face of the rotor of cylinder barrel, thus allowing the use of normal commercial tolerances in the machining processes associated with the relative disposition of the aforesaid components.

A further desirable feature of this invention is the alleviation of the arduous bearing loads on the joint faces of the cylinder barrel and the floating valve member. This is achieved by putting into balanced relationship the axial thrust of the cylinder barrel, the separating force generated by the oil film between the cylinder barrel and the face of the floating valve member, and the axial thrust at the back of the floating valve member.

Axial thrust, and the degree of load fluctuation of the cylinder barrel is a function of its design and operating conditions, and from this known data can be calculated the extremes of axial thrust. The port faces of the cylinder barrel and the floating valve distribution member can be so designed that the separating force generated by the pressure oil film between the two port faces equals in magnitude, but is of opposite direction to, a value that lies between the minimum and maximum axial thrust loads of the cylinder barrel.

The difference between this separating force and the axial thrust of the cylinder barrel at any instant is the magnitude of the load to be carried by the aforementioned combined radial and thrust bearings. The exigencies of design will determine whether this resultant load be carried by one or other of the two bearings, or partly carried by both.

The desirable balanced relationship of the pump or motor unit is completed by arranging the design of the back of the floating valve distribution member so that the hydraulic system pressure will produce on the back of the valve a force of substantially equal magnitude, but of opposite direction, to the maximum separating force at the joint face, and whose centre of pressure is coincident with that of the joint face.

Reversal of flow will cause no change in the magnitude of the separating force but the centre of pressure of that force will be displaced 180°.

The construction of the back of a floating valve to meet the above requirements demands two equal areas whose centres of pressure are equi-distant from the axis of the pump or motor, i.e., the geometric centre of the face of the valve, these areas being hydraulically sealed from each other, one being subjected to high pressure and the other to low pressure.

To achieve compactness of design, and to facilitate manufacture, sealing and housing, the back of the floating valve member consists of two cylindrical steps of radius R and $r$ respectively, radius R being concentric with axis of pump and face valve. Thus, these two equal areas may be expressed as $\pi r^2 = \pi(R^2 - r^2)$. If $y$=distance of centre of circle, radius $r$, from geometric centre, it then follows that $(r+y) \angle R$. This form of construction automatically gives centres of pressure equi-distant from the geometric centre of the valve, but the degree of eccentricity $y$ is severely limited. In order to keep the centres of pressure of both face and back of valve coincident, it is necessary to introduce forces on the face of the valve whose effect is to move the centre of pressure of the face of the valve into line with the centre of pressure of the back of the valve. This is done by introducing blind ports on the face of the valve, either inside or outside the main ports, without changing the desired magnitude of the separating force.

The difference between the maximum and minimum values of this separating force is very small in relation to the load being carried by the oil film at the joint face and thus does not require good bearing qualities of the materials used in the construction of the port faces, resulting in simplicity of manufacture and reduction of cost.

The invention further consists of a hydrostatic transmission comprising a pump and motor whose fluid circuit is connected through a pair of floating valve distribution members mounted back to back.

The invention will be further described with reference to the accompanying drawings in which:

FIGURE 1 is an axial section of a combined pump and motor according to the invention, FIGURE 2 is a view of the pump valve looking from the left in FIGURE 1, while FIGURE 3 is a view of the pump valve looking from the right in FIGURE 1.

The pump comprises a cylinder barrel 1 supported by a combined radial and thrust bearing 2 and 3 in a casing 4. Around the axis of the cylinder barrel 1 are a plurality of spaced cylinders 5 whose axes may or may not be parallel to the cylinder barrel axis and into them fit pistons 6 with ball ends fitting into shoes 7 which bear against a swashplate 8.

The cylinders 5 are extended to ports 5a at the end of the cylinder barrel 1 and against these ports abuts valve distribution member 9 which extends the ports to apertures 10 and 11, which according to direction of rotation or swashplate inclination, may be in the pressure or exhaust circuit.

The member 9 comprises two cylindrical parts in stepped relation, and is slidably mounted in a supporting and mating member 12. Pressure chambers or free spaces 9a and 9b are thus created and sealed from atmosphere and each other by O rings 13 and 14. Blind ports or second pressure or reaction chambers 30 and 31 are connected by passages 10a and 11a to main apertures 10 and 11.

The supporting member 12 also abuts a casing 15 which supports, by means of combined radial and thrust bearings 16, 17, a cylinder barrel 18 of a motor, which contains a plurality of spaced cylinders 19 whose axes may or may not be parallel to the axis of cylinder barrel 18. Into cylinders 19 fit pistons 20 formed with ball ends fitting into shoes 21 which bear on a swashplate 22.

The cylinders 19 are extended to the inner end of the cylinder barrel which abuts a distribution valve member 23, fitted with O-rings 24, 25, and slidably mounted in supporting member 12.

Apertures 26, 27 connect cylinders 19 to pressure chambers 28, 29, which are shown to be in fluid circuit with pressure chambers 9b and 9a respectively. Blind ports 32 and 33 are connected by passages 26a and 27a to apertures 26 and 27. Thus member 23 functions in a like manner to member 9.

Consider cylinder barrel 1 to be a component part of an axial piston pump in an hydrostatic transmission. When rotated, a pressure and exhaust fluid circuit is created and under the influence of the pressures thus created said cylinder barrel is urged against the combined radial and thrust bearing 3 with a force whose magnitude is a function of the design of cylinder barrel 1 and the pressure created. This force fluctuates between a minimum and a maximum at a frequency which is a function of the rotational speed and the number of cylinders 5.

The mating faces of cylinder barrel 1 and floating valve member 9 are so designed that the fluid film distribution across the aforementioned faces, caused by fluid pressure, exerts a separating force to counteract the axial thrust of cylinder barrel 1, thus relieving bearing 3 of all, or part, according to design requirements, of the said thrust from cylinder barrel 5, leaving bearings 2 and 3 to carry in some arbitrary proportion only the difference between minimum and maximum said thrust of cylinder barrel 5.

The said separating force at the joint face of cylinder barrel 5 and floating valve member 9 would also urge said member 9 away from said joint face. To counteract this tendency which would result in loss of fluid from the fluid circuit, pressure chambers 9a and 9b are so designed that the fluid pressure contained in said chambers exerts a force substantially equal in magnitude and moment, but of opposite direction, to said separating force, thus retaining member 9 in a condition of balance relative to cylinder barrel 5 in a manner which obviates wear and keeps loss of pressure fluid to a minimum.

Concentricity and/or alignment errors in the mounting and housing of bearings 2 and 3, and the squareness to the rotational axis of the joint face of cylinder barrel 5 could result in a wobble of said joint face, resulting in excessive wear or leakage. The location of member 9, mounted on O-rings 13 and 14, enables it to tilt to compensate for the effect of wobble of said joint face thus eliminating the source of excessive wear and leakage, and allowing the use of wider alignment and concentricity tolerances.

Similar conditions apply to the motor unit of the hydrostatic transmission.

Various modications may be made within the scope of the invention. For example, the bearings shown may be replaced by one double row bearing, or by further example, by one single row bearing, which would require the resultant load to be biassed against such a bearing at all times.

The floating valve members 9 and 23 are conveniently shown to have blind ports at a lesser radius than the main flow ports. They may also be of greater radius.

The pump and motor are conveniently shown to be in line, but they may equally be in any desired geometric disposition.

The floating valve member of the construction outlined herein may be used in a separate pump or motor of axial piston or radial piston design.

What I claim is:

A hydraulic pump or motor comprising an elongated first housing, an elongated barrel mounted coaxially within said housing and rotatable relative to said housing, an additional housing portion fixed to the forward end of said housing, a distributor member formed with low and high pressure ports, said distributor member being mounted centrally within said additional housing portion and adjacent the forward end of said barrel with the inward end of the distributor member being formed to provide at least two reaction surfaces with one of said reaction surfaces in communication with the low pressure port and the other surface in communication with the high pressure port, O-rings surrounding said distributor member and providing an annular seal between the two reaction surfaces and said housing portion, said housing portion having a hollow interior portion defining free space adjacent each of said forward reaction surfaces of said distributor member to allow said distributor member to slide axially forward from said barrel and rotate about an axis perpendicular to said barrel, said barrel having pistons slidably mounted in passages circumferentially located about said barrel, a swash plate mounted to the rearward end of said barrel, said pistons having swivel mounting means fixed at their rearward ends, said pistons having shoes swivel mounted to said swivel mounting means at said rearward remote ends for engaging said swash plate, said pistons being adapted to rotate with said barrel with the shoes engaging said plate to reciprocate said pistons, one of said ports of said distributor member being tapered toward one of said free spaces, said barrel and distributor member forming second reaction chambers, said distributor member having additional passages communicating at their one ends with said high and low pressure ports and communicating at their other ends with said second reaction chambers.

References Cited in the file of this patent

UNITED STATES PATENTS

| | | |
|---|---|---|
| 2,350,683 | Jossim et al. | June 6, 1944 |
| 2,397,314 | Grosser | Mar. 26, 1946 |
| 2,458,985 | Ferris et al. | Jan. 11, 1949 |
| 2,757,612 | Shaw | Aug. 7, 1956 |
| 2,845,941 | Wagner | Aug. 5, 1958 |
| 2,861,552 | Creighton et al. | Nov. 25, 1958 |

FOREIGN PATENTS

| | | |
|---|---|---|
| G–17919 | Germany (Kl. 59a, 14) | Aug. 30, 1956 |
| 345,534 | Switzerland | May 13, 1960 |
| 577,016 | Great Britain | May 1, 1946 |
| 939,486 | Germany | Feb. 23, 1956 |
| 1,207,087 | France | Feb. 15, 1960 |